Patented Mar. 24, 1953

2,632,699

UNITED STATES PATENT OFFICE 2,632,699

MANUFACTURE OF HIGH WET STRENGTH PAPER

William F. Fowler, Jr., and Donald R. Spear, Rochester, N. Y., assignors to Eastman Kodak Company, Rochester, N. Y., a corporation of New Jersey No Drawing. Application June 17, 1950, Serial No. 168,858

9 Claims. (Cl. 92—3)

This application relates to the manufacture of paper especially adapted for photographic purposes by means of the use therein of a sizing aid, a polymeric hydrosol and a precipitant.

Ordinarily paper is sized to resist penetration of liquids therein and to give the paper a certain amount of body. Also for certain purposes, such as in the photographic art, it is desirable that the paper have a substantial wet strength due to the fact that it is immersed in aqueous baths of various types. The sizing of the paper at the present time ordinarily involves the precipitation in the mixing chest of stearic acid (or its aluminum salts) from a solution of sodium stearate in alkaline water by the addition of aluminum sulphate or the like thereto. Recently aluminum chloride has been suggested for this purpose.

To impart high wet strength to the paper in the process of being prepared, water soluble urea-formaldehyde resins or melamine-formaldehyde resins have been added to the pulp slurry after the Jordaning operation and prior to the dispensing of the pulp on to the wire of the paper machine. Although this method of preparing high wet strength paper has been found to be satisfactory in some instances, in other instances it has been found that the resins added impart undesirable characteristics thereto, particularly where the prevalence of even a trace of formaldehyde cannot be tolerated. Also the preparation of sized high wet strength papers in this fashion has involved several operations and a large quantity of expensive equipment.

Other methods of increasing the wet strength of paper have been proposed. For instance, latices of various types have been suggested as suitable for this purpose. Many of these materials have been found to be unstable in the presence of ultraviolet light and also contain sulfur which is active photographically and would be especially undesirable in the case of photographic use. Hydrosols of polyvinyl acetate have been suggested both as coating compositions for paper and use in tub sizing operation. This resin, however, is not sufficiently hydrophobic to be useful as a sizing agent.

One object of our invention is to provide a method for use in the preparation of paper which simultaneously sizes and increases the wet strength thereof as well as maintaining the desirable dry strength. Another object of our invention is to provide a method of preparing high quality photographic raw stock. A still further object of our invention is to provide a method for preparing high wet strength paper by means of styrene-acrylate resins in the preparation of the paper.

We have found that by adding to a paper pulp while in suspension a composition of a water soluble salt of l-pimaric acid-maleic anhydride adduct (or other sizing aid), a water soluble styrene-acrylate resin, and an aluminum salt of a monobasic acid and preparing paper therefrom, that a product is obtained having good sized properties, high wet strength, and good resistance to ultraviolet light.

The water soluble salt of the l-pimaric acid-maleic anhydride adduct which will be termed herein a sizing aid may be either an alkali metal salt, an ammonium salt, or an amine salt thereof. The sodium salt may be prepared as follows: 98 parts of sodium hydroxide pellets were dissolved in 1000 parts of distilled water and the solution was heated on a steam bath with stirring. When the temperature of the solution was about 80° C., 325 parts of the l-pimaric acid-maleic anhydride adduct previously ground to a fine powder were added. Almost immediate solution occurred to produce a dark brown fluid containing 30.2 per cent solids. This solution was cooled to room temperature and a portion of it was diluted with distilled water to produce the desired concentration. We have found that the water soluble salts of abietic acid and of hydrogenated abietic acid are also effective as sizing aids in preparing paper in accordance with our invention.

The styrene-acrylate resin for use in preparing paper in accordance with our invention may be prepared as follows: 0.63 part of potassium persulfate and 1.25 parts of sodium lauryl sulfate were dissolved in 500 parts of distilled water and were placed in a vessel equipped with a dropping funnel, a mechanical stirrer, and a reflux condenser. The solution was heated with steam while stirring with the dropwise addition of a mixture consisting of 63 parts of washed styrene and 63 parts of washed n-butyl acrylate. Polymerization to produce a milky-appearing sol was essentially complete in about 45 minutes. The mixture was then heated for two hours in order to insure complete polymerization. It was then cooled and stored ready for use. Instead of butyl acrylate, other acrylates may be employed in preparing the resin for use in our composition. Some of the acrylates which may be employed are n-butyl methacrylate, n-propyl acrylate, n-propyl methacrylate, isopropyl acrylate, n-amyl acrylate, n-amyl methacrylate. The aluminum salt of a monobasic acid which is most useful in the processes described herein is aluminum chloride. It is desirable to obtain the optimum effect from the resins employed that the percentage of the styrene in the styrene-acrylate copolymer be at least 40% and not greater than 75%, although percentages outside of this range would give resins having an effectiveness though more limited.

It is desirable in using the various ingredients of the composition which we have described that those ingredients be added in the form of their aqueous solutions or sols as the case may be. For instance, the sizing aid is conveniently employed as a 5 per cent aqueous solution, whereas the concentration of the resin in the hydrosol may be as much as 20% or higher (40%). We have found that where the materials are used in proportions equivalent to the following that the best results are obtained: 60-70 parts of dry pulp, 1-5 parts sizing aid, 1-20 parts of the styrene-acrylate resin, 2-20 parts of aluminum chloride.

The following examples illustrate the use of our invention in the preparation of paper sheets, the following all involving the preparation of hand sheets to show the effectiveness of our method.

*Example I.*—Three liters of 2¼% suspension of α-cellulose pulp which had been beaten for one hour were stirred while the following chemicals were added: 5 ml. of 5% solution of trisodium salt of l-pimaric acid-maleic anhydride adduct, 10 ml. of the hydrosol of styrene-n-butyl acrylate such as described above, 25 ml. of 14 per cent of aluminum chloride in water. Also 1.7 ml. of 10% solution of quinoline hydrochloride in water were added, although this addition is optional. After thoroughly mixing and diluting the pulp slurry to the desired consistency, hand sheets approximately eight inches square and weighing 2.50 grams were prepared on a Noble and Wood hand sheet device. The sheets were dried by passing over a rotary drum dryer at 210° F. over the course of three minutes.

The hand sheets so prepared were tested for degree of sizing by means of the Valley penetration test and by the Cobb size test (TAPPI standard No. T441-m-45). Wet strength was evaluated by soaking a hand sheet in distilled water for two hours at room temperature and measuring the bursting strength on the Minden paper tester in pounds per square inch.

The Valley penetration recorded in seconds is measured as follows: A two-inch square sample of paper to be tested is mounted between two wooden blocks that have been drilled to allow a solution consisting of 516 ml. of distilled water, 24 g. of NaCl and 60 ml. of glycerine to contact both sides of the paper simultaneously over a circular area of approximately 1 inch diameter. A potential is applied that allows 200 ma. of current to flow when no paper sample is present. When a paper sample is mounted in the blocks, the time in seconds is noted from the moment the electrolyte is first brought in contact with the paper sample until 160 milliamperes of current flows through the paper sample.

The results on testing the hand sheet prepared were as follows:

Valley penetration_____secs__ 39
Cobb size_____grams__ 0.156
Wet strength_____p. s. i__ 8¼

*Example II.*—A series of runs were made in a similar manner as in Example I, the compositions used and the results obtained being as follows:

| Composition | Valley Penetration | Cobb Size | Wet Strength | Exp. | U. V. Unexp. | Diff. |
|---|---|---|---|---|---|---|
| 2.5 ml. 10% quinoline HCl<br>5 ml. 5% sodium salt of l-pimaric acid-maleic anhydride adduct<br>10 ml. hydrosol of styrene-acrylate resin<br>25 ml. aluminum chloride solution (14%) | 40 | 0.149 | 8½ | 82.5 | 80.2 | 2.3 |
| 5 ml. sodium salt of l-pimaric acid-maleic anhydride adduct<br>10 ml. hydrosol of styrene-acrylate resin<br>25 ml. aluminum chloride solution (14%) | 36 | 0.191 | 9½ | 84.0 | 81.1 | 2.9 |
| 10 ml. hydrosol of styrene-acrylate resin<br>25 ml. aluminum chloride solution (14%)<br>25 ml. 10% quinoline HCl | 1 | Complete penetration. | 4¾ | 83.0 | 79.5 | 3.5 |
| 10 ml. hydrosol of styrene-acrylate resin<br>25 ml. aluminum chloride solution (14%) | 1 | ___do___ | 3¾ | 83.0 | 80.1 | 2.9 |
| 2.5 ml. 10% quinoline HCl<br>5 ml. sodium salt of l-pimaric acid-maleic anhydride adduct<br>25 ml. aluminum chloride solution (14%) | 1 | ___do___ | 1¾ | 83.7 | 79.8 | 1.9 |

The ultraviolet reversion test (last two columns) was run by subjecting examples to ultraviolet light covering the ½ of the sample with material to prevent exposure while maintaining a temperature of 50° C. The exposure time recorded is the time required to revert a standard pulp sample 3½%, the reversion being the difference in brightness between the exposed and unexposed parts. Brightness is measured on a recording spectrophotometer at 456 mµ wave length.

By comparison with the results obtained, water leaf paper is almost instantaneously penetrated and has a negligible wet strength. From the results given, it will be seen that it is desirable to have present all three of the ingredients listed for the comparison as specified above.

*Example III.*—A hydrosol was prepared similar to that described previously, except that it contained the following monomeric mixture: 61 parts of styrene, 61 parts of butylacrylate and 6.2 parts of 50% aqueous acrylic acid. When this hydrosol was employed in preparing sheets of paper, the results obtained were as follows:

Valley penetration _____ 33
Cobb size_____ 0.166
Wet strength_____ 8¾

The ammonium salt of l-pimaric acid-maleic anhydride adduct was prepared as follows: 302 parts of commercial grade abietic acid were ground to a fine powder and slowly heated to 210° C. with 98 parts of maleic anhydride. When the temperature had reached 100° C., the mass melted. At 160° C., it began to darken slightly but the temperature was slowly raised to 210° C. over the period of an hour. After cooling 100 parts of the finely divided product was added to a mixture of 300 parts of distilled water and 54 parts of 28% aqueous ammonium hydroxide. The resulting clear brown solution was heated briefly with stirring on the steam bath and was diluted with distilled water to a solution having a solids content of 5%. Paper was prepared using this material in the following proportions:

5 ml. 5% ammonium salt of adduct
10 ml. 20% styrene butyl methacrylate copolymer hydrosol
25 ml. 14% aluminum chloride solution The results obtained were as follows:

Valley penetration_____ 92
Cobb size_____ 0.138
Wet strength_____ 8

*Example IV.*—Various styrene-acrylate resins were prepared using the following proportions:

| Number | Parts Styrene | Acrylate Ester | Parts Acrylate |
|---|---|---|---|
| 1 | 60.1 | n-Propyl | 65.9 |
| 2 | 56.5 | n-Butyl | 69.5 |
| 3 | 53.2 | n-Amyl | 72.8 |
| 4 | 50.3 | n-Hexyl | 75.7 |
| 5 | 47.5 | 2-Butoxyethyl | 78.5 |
| 6 | 81.4 | n-Propyl | 44.6 |
| 7 | 78.0 | n-Butyl | 48.0 |
| 8 | 75.0 | n-Amyl | 51.0 |
| 9 | 72.0 | n-Hexyl | 54.0 |
| 10 | 69.0 | 2-Butoxyethyl | 57.0 |

Hand sheets were prepared from these various styrene-acrylate resins by beating three liters of 2¼% pulp suspension for one hour while adding the following chemicals:

5 ml. of 5% salt of 1-pimaric acid-maleic anhydride adduct. ⎫ added as a
10 ml. of 20% hydrosol of styrene-acrylate copolymer_____ ⎬ mixture.
25 ml. of 14% aqueous aluminum chloride.

The paper sheet was prepared as described in Example I. These sheets were tested for physical properties and the results are summarized as follows, using the designations of acrylate esters to indicate the sheets tested.

| Number | Acrylate Ester in Copolymer | Mullen | Wet Strength | Sizing | |
|---|---|---|---|---|---|
| | | | | Valley | Cobb |
| 1 | n-Propyl | 35 | 7¾ | 36 | .159 |
| 2 | n-Butyl | 30 | 6 | 36 | .170 |
| 3 | n-Amyl | 30 | 4 | 33 | .168 |
| 4 | n-Hexyl | 30 | 3¾ | 32 | .178 |
| 5 | 2-Butoxyethyl | 29 | 3 | 24 | .208 |
| 6 | n-Propyl | 36 | 7½ | 39 | .168 |
| 7 | n-Butyl | 34 | 8¾ | 47 | .155 |
| 8 | n-Amyl | 32 | 8½ | 44 | .150 |
| 9 | n-Hexyl | 30 | 7¾ | 48 | .149 |
| 10 | 2-Butoxyethyl | 33 | 6¾ | 35 | .159 |

In preparing paper sheets, some times it is desirable to increase the Mullen value (TAPPI T403-m-41) or dry bursting strength thereof. In accordance with inventions it may be desirable to add such material. Some of the materials which have been found to be useful in this connection are starch used in the proportion of 2-6% based on the dry sheet of the pulp, methacrylamide used in a proportion of 5-20% based on the weight of the resin employed, or locust bean gum. An illustration of the preparation of hand sheets including starch is as follows:

*Example V.*—Six liters of a 2¼% suspension of α-cellulose pulp which had been beaten for one hour were also mixed with the following chemicals:

1. A volume of a 4½% aqueous solution of corn starch prepared by heating a slurry of corn starch and cold water to 170° F. as indicated in the table.
2. 10 ml. of a 5% of the sodium salt 1-pimaric acid-maleic anhydride adduct.
3. 20 ml. of 20% hydrosol of styrene-n-butyl acrylate copolymer.
4. 10 ml. of 14% aqueous aluminum chloride.

These mixtures were then formed into sheets in the manner indicated herein. The various sheets containing different amounts of starch were tested for physical properties with the results as follows:

| Volume Starch Solution Added | Mullen | Wet Strength | Sizing | |
|---|---|---|---|---|
| | | | Valley | Cobb |
| None | 37 | 9¾ | 47 | .131 |
| 33 ml | 40 | 10¼ | 47 | .135 |
| 66 ml | 40 | 10¼ | 48 | .128 |
| 99 ml | 40 | 9 | 42 | .140 |
| 132 ml | 43 | 9 | 38 | .142 |
| 165 ml | 40 | 7¾ | 36 | .149 |

The sizing method of our invention has been operated using various concentrations of the chemicals which are employed, and it has been found that the concentrations used of the various chemicals in their aqueous solutions or suspensions may be varied depending on the convenience in carrying on this operation.

*Example VI.*—A copolymer latex was prepared as follows: 19.9 g. of freshly recrystallized methacrylamide, 1.26 g. of sodium lauryl sulfate, and 0.63 g. of potassium persulfate were dissolved in 500 ml. of hot tap water, placed in a reaction vessel equipped with refluxing apparatus, wherein the mass was stirred and heated on a steam bath while a mixture containing 41.5 g. of washed n-butyl acrylate and 64.9 g. of washed styrene were added dropwise with stirring. At the end of one hour of steam heating, the resultant hydrosol was cooled to room temperature. The resulting product was tested in paper sheets using therewith the sodium salt of pimaric, acid-maleic anhydride adduct, and aluminum chloride as described herein. The results obtained were as follows:

Mullen _____ 37
Wet strength _____ 9¾
Valley penetration _____ 37
Cobb _____ .131

*Example VII.*—A styrene-butyl acrylate hydrosol was prepared in accordance with the procedure outlined in the preceding example. Samples of paper were prepared using this hydrosol and aluminum chloride together with a sizing aid, in one case, using a 5% solution of the sodium salt of pimaric acid—acid-maleic anhydride adduct, and in another case, using a 5% solution of sodium abietate, and in the third case, a 5% solution of sodium tetrahydroabietate. The result obtained is summarized in the table below:

| Sizing Aid | Mullen | Wet Strength | Valley Penetration | Cobb |
|---|---|---|---|---|
| Trisodium maleo pimarate comparison | 37 | 13½ | 87 | .137 |
| Sodium abietate | 35 | 12½ | 75 | .134 |
| Sodium tetrahydroabietate | 37 | 10½ | 76 | .139 |

We have found that it is better to add the chemicals to the pulp after the pulp suspension has been subjected to a moderate beating. It is preferable that the pulp be beaten only so as to have a slowness of 10-50 seconds (Williams) as excessive beating reduces the sizing values and wet strengths of the paper prepared therefrom. We have further found that the order of adding the various chemicals to the suspension is not critical with the exception that for best results the aluminum salt should not be contacted with either the resin or the sizing aid alone, but these two materials should be together when so contacted. For instance, if the aluminum salt is added first to the pulp, then the sizing aid and the resin must be added as a mixture. If the sizing aid or the resin is to be added first to the pulp, then it is necessary to add the other, either separately or as their mixture, before adding the aluminum salt thereto.

We have further found that in preparing the resin hydrosols for use in our process that the surface-active agent which is employed in that preparation should be of the anionic type and that it should not be more than 2 per cent and preferably 1 per cent or less (but at least 0.1%) based on the monomer content of the mass. Some surface-active agents which may be employed are sodium higher alcohol sulfates, sodium salts of higher fatty acids, sulfated fatty alcohols, and the like.

What we claim and desire to secure by Letters Patent of the U. S. is:

1. A composition useful for imparting high wet strength to paper comprising 1-5 parts of the sodium salt of a pimaric acid-maleic anhydride adduct, 1-20 parts of a styrene-butyl acrylate resin in which the styrene is 40-75% thereof, and 2-20 parts of aluminum chloride.

2. A high wet strength paper essentially consisting of paper pulp containing therein a composition comprising 1-5 parts of a sizing aid selected from the group consisting of the water soluble salts of pimaric acid-maleic anhydride adduct, the water soluble salts of abietic acid, and the water soluble salts of hydrogenated abietic acid, 1-20 parts of a styrene-alkyl acrylate resin in which the alkyl has 3-6 carbon atoms and the styrene is 40-75% thereof, and 2-20 parts of aluminum chloride.

3. A high wet strength paper essentially consisting of paper pulp containing therein a composition comprising 1-5 parts of an alkali metal salt of pimaric acid-maleic anhydride adduct, 1-20 parts of a styrene-alkyl acrylate resin, the alkyl having 3-6 carbon atoms and the styrene being 40-75% thereof, and 2-20 parts of aluminum chloride.

4. A composition useful for imparting high wet strength to paper comprising 1-5 parts of a sizing aid selected from the group consisting of the water soluble salts of pimaric acid-maleic anhydride adduct, the water soluble salts of abietic acid, and the water soluble salts of hydrogenated abietic acid, 1-20 parts of a styrene-alkyl acrylate resin, the alkyl having 3-6 carbon atoms and the styrene being 40-75% thereof, and 2-20 parts of aluminum chloride.

5. A composition useful for imparting high wet strength to paper comprising 1-5 parts of an alkali metal salt of pimaric acid-maleic anhydride adduct, 1-20 parts of a styrene-alkyl acrylate resin, the alkyl having 3-6 carbon atoms and the styrene being 40-75% thereof, and 2-20 parts of aluminum chloride.

6. A composition useful for imparting high wet strength to paper comprising 1-5 parts of an alkali metal salt of abietic acid, 1-20 parts of a styrene-alkyl acrylate resin, the alkyl having 3-6 carbon atoms and the styrene being 40-75% thereof, and 2-20 parts of aluminum chloride.

7. A composition useful for imparting high wet strength to paper comprising 1-5 parts of an alkali metal salt of hydrogenated abietic acid, 1-20 parts of styrene-alkyl acrylate resin, the alkyl having 3-6 carbon atoms and the styrene being 40-75% thereof, and 2-20 parts of aluminum chloride.

8. In a method of preparing high wet strength paper, a step which comprises incorporating into the suspension of paper pulp employed in preparing the paper a composition comprising 1-5 parts of an alkali metal salt of pimaric acid-maleic anhydride adduct, 1-20 parts of a styrene-alkyl acrylate resin, the alkyl having 3-6 carbon atoms and the styrene being 40-75% thereof, and 2-20 parts of aluminum chloride.

9. In a method of preparing high wet strength paper, the step which comprises incorporating into the suspension of paper pulp employed in preparing the paper a composition comprising 1-5 parts of the sodium salt of a pimaric acid-maleic anhydride adduct, 1-20 parts of a styrene-butyl acrylate resin in which the styrene is 40-75% thereof, and 2-20 parts of aluminum chloride.

WILLIAM F. FOWLER, Jr.
DONALD R. SPEAR.

REFERENCES CITED

The following references are of record in the file of this patent:

UNITED STATES PATENTS

| Number | Name | Date |
| --- | --- | --- |
| 1,943,975 | Lathrop et al. | Jan. 16, 1934 |
| 2,081,889 | Borglin | May 25, 1937 |
| 2,216,845 | Larson | Oct. 8, 1940 |
| 2,301,998 | Berstein et al. | Nov. 17, 1942 |
| 2,315,675 | Trommsdorf | Apr. 6, 1943 |
| 2,338,839 | Coss | Jan. 11, 1944 |
| 2,394,289 | Boughton | Feb. 5, 1946 |

OTHER REFERENCES

Taft: Paper Trade Journal, March 6, 1941, pp. 34-37.

Dreshfeld: Paper Trade Journal, July 17, 1941, page 40.

Collins et al.: Paper Trade Journal, September 25, 1941, pages 94-99.

Wilson et al.: Paper Trade Journal, November 18, 1943, page 32.

Rivise: Paper Trade Journal, March 21, 1929, page 63.